United States Patent
Beeche et al.

(10) Patent No.: US 6,217,044 B1
(45) Date of Patent: Apr. 17, 2001

(54) STEERABLE AND RETRACTABLE WHEELS FOR MULTI-PURPOSE CARRIAGE

(75) Inventors: Gregory L. Beeche, Mechanicville; Roy Scrafford, Glenville, both of NY (US)

(73) Assignee: Beeche Systems, Corp., Scotia, NY (US)

( * ) Notice: Subject to any disclaimer, the term of this patent is extended or adjusted under 35 U.S.C. 154(b) by 0 days.

(21) Appl. No.: 09/292,434

(22) Filed: Apr. 15, 1999

(51) Int. Cl.⁷ .................................................. B60P 3/40
(52) U.S. Cl. ..................... 280/43; 280/5.3; 280/43.14; 280/6.155; 280/43.17; 280/43.24; 180/24.02
(58) Field of Search ................ 280/43, 5.28, 43.1, 280/43.11, 43.12, 43.13, 43.14, 6.155, 43.17, 414.5, 43.2, 43.21, 43.24, 5.3; 180/24.02; 172/419, 427

(56) References Cited

U.S. PATENT DOCUMENTS

| | | |
|---|---|---|
| D. 202,907 | 11/1965 | Glass et al. . |
| 707,162 | 8/1902 | Sauntry . |
| 937,043 | 10/1909 | Bilger . |
| 1,724,470 | 8/1929 | Gilbert . |
| 1,789,896 | 1/1931 | Gilbert . |
| 1,792,976 | 2/1931 | Gilbert . |
| 1,837,553 | 12/1931 | Key . |
| 1,943,196 | 1/1934 | Ward . |
| 2,008,445 * | 7/1935 | Goodsman ............................. 254/7 |
| 2,468,966 | 5/1949 | Farmer . |
| 3,081,883 | 3/1963 | Minty . |
| 3,130,813 | 4/1964 | Fackler et al. . |
| 3,159,110 | 12/1964 | Wylie . |
| 3,292,351 * | 12/1966 | Larson ............................. 56/25.4 |
| 3,458,212 * | 7/1969 | Swezy et al. ..................... 280/43.11 |
| 3,572,458 | 3/1971 | Tax . |
| 3,780,878 | 12/1973 | Morrow . |
| 3,807,575 | 4/1974 | Merrick . |
| 3,854,550 | 12/1974 | Shingler . |
| 3,912,088 | 10/1975 | Bronfman . |
| 3,933,250 | 1/1976 | Roberts et al. . |
| 4,004,778 | 1/1977 | Steinhagen . |
| 4,008,783 | 2/1977 | Herrmann et al. . |
| 4,016,688 | 4/1977 | Tiffin et al. . |
| 4,050,587 | 9/1977 | Moen . |
| 4,053,060 | 10/1977 | Wilson . |
| 4,200,162 | 4/1980 | Tax . |
| 4,223,912 * | 9/1980 | Reyes ............................. 280/767 |
| 4,235,454 * | 11/1980 | Gray et al. ....................... 280/766.1 |
| 4,249,282 * | 2/1981 | Little ................................. 16/32 |
| 4,271,919 * | 6/1981 | Vaughan ............................ 180/16 |
| 4,449,635 | 5/1984 | Helm et al. . |
| 4,469,191 | 9/1984 | Truninger . |
| 4,611,816 * | 9/1986 | Traister et al. .................... 280/43.2 |
| 4,664,270 | 5/1987 | Voelz . |
| 4,749,324 | 6/1988 | Rulison . |
| 4,750,628 | 6/1988 | Laurich-Trost . |
| 4,757,875 | 7/1988 | Hade, Jr. et al. . |
| 4,782,962 | 11/1988 | Hackworth et al. . |
| 4,801,117 | 1/1989 | Take . |
| 4,843,972 * | 7/1989 | Kabilka et al. .................... 104/296 |
| 4,925,039 | 5/1990 | Macris . |

(List continued on next page.)

FOREIGN PATENT DOCUMENTS

| | | |
|---|---|---|
| 2451673 | 5/1976 | (DE) . |
| 2128144 | 4/1984 | (GB) . |
| 4-325382 | 11/1992 | (JP) . |

Primary Examiner—Paul N. Dickson
Assistant Examiner—Bridget Avery
(74) Attorney, Agent, or Firm—Schmeiser, Olsen & Watts

(57) ABSTRACT

Wheel assemblies for attachment to a carriage or a vehicle. The wheel assemblies can be configured for four wheel steering, locked in predetermined directions, or free pivoting. The wheel assemblies further include an apparatus for retracting and extending the wheels of the carriage to support the carriage on fixed length supports.

23 Claims, 10 Drawing Sheets

U.S. PATENT DOCUMENTS

| | | |
|---|---|---|
| 5,011,364 | 4/1991 | Anderson . |
| 5,076,448 | 12/1991 | Ballard . |
| 5,249,636 * | 10/1993 | Kruse et al. .......................... 180/21 |
| 5,249,643 | 10/1993 | Backer et al. . |
| 5,341,898 | 8/1994 | Baziuk . |
| 5,431,254 * | 7/1995 | Kramer et al. .......................... 188/7 |
| 5,480,041 | 1/1996 | Turner . |
| 5,494,126 * | 2/1996 | Meeker ................................. 180/13 |
| 5,547,038 * | 8/1996 | Madwed ............................... 180/253 |
| 5,690,240 | 11/1997 | Thiermann, Sr. . |
| 5,699,873 | 12/1997 | Moriya et al. . |
| 5,706,736 | 1/1998 | Thorsen . |
| 5,716,186 * | 2/1998 | Jensen et al. ........................ 414/458 |
| 5,758,785 | 6/1998 | Spinosa et al. . |
| 5,810,183 | 9/1998 | Feider et al. . |

* cited by examiner

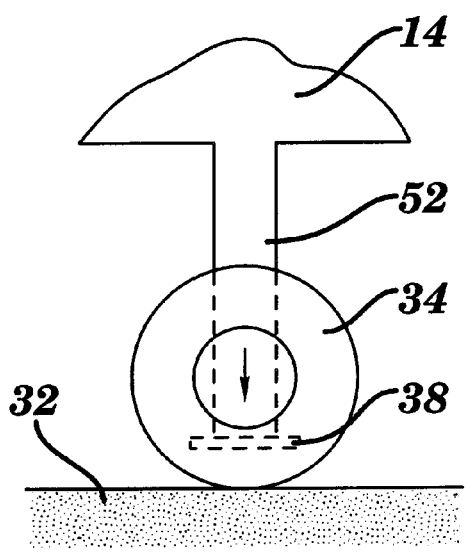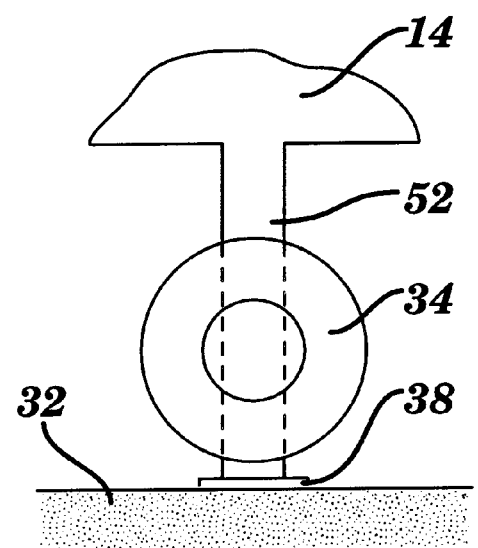
FIG. 4         FIG. 5

STEERABLE AND RETRACTABLE WHEELS FOR MULTI-PURPOSE CARRIAGE

FIELD OF THE INVENTION

The present invention relates generally to a carriage for a mobile vehicle, and more particularly, to a carriage for a compact mobile crane. The carriage includes a plurality of retractable and extendable wheel assemblies each including a multi-mode steering system.

BACKGROUND OF THE INVENTION

Mobile cranes and other utility vehicles with wheels are well known in the prior art. The wheels provide such vehicles with support, mobility, and steering. When the vehicle includes a crane, some additional type of jacking system is generally attached to the carriage of the vehicle in order to lift the carriage in an upward direction until the wheels are no longer in contact with a support surface. This action provides a secure support footing for the crane to prevent the crane from sliding or rolling along the support surface when a load is lifted. In the prior art, separate steering and jacking systems have been employed to provide such mobile vehicles with steering and jacking capabilities. Unfortunately, the steering and jacking systems of the prior art tend to be highly complex, expensive to produce and maintain, and difficult to use.

SUMMARY OF THE INVENTION

In order to overcome the above deficiencies of the prior art, the present invention provides a multi-purpose wheel assembly for a mobile crane or other utility vehicle. Although described in detail below in conjunction with a mobile crane, it should be readily apparent that the wheel assembly of the present invention can be employed in a wide variety of other types of utility vehicles.

The wheel assembly of the present invention combines multi-mode steering and wheel retraction and extension in one assembly that can be easily attached to the carriage of a mobile crane. Unlike the prior art, separate jacking devices are not required to jack the carriage of the mobile crane in an upward direction. Rather, the wheel assembly includes a wheel retraction apparatus for retracting and extending the wheels of the wheel assembly relative to the carriage, and a fixed length king pin support housing. When the wheels are retracted by the wheel retraction apparatus, the carriage is lowered toward a support surface until a support pad on the king pin support housing contacts the support surface. As the wheels are retracted further, the wheels leave contact with the support surface, and the carriage is fully supported by the support pad and the king pin housing support. Conversely, when the wheels are extended downward by the wheel retraction apparatus beyond the support pad, the wheels contact the support surface and support the carriage, thereby allowing the carriage to be easily steered and moved along the support surface.

Three modes of wheel positioning can be selected using a single control element. A first mode of wheel positioning provides all wheel steering. In the present invention, at least two wheels can be selected for the all wheel steering mode. Regardless of the actual number of wheels that are selected, this first mode of wheel positioning will hereafter be referred to as "four wheel steering." A second mode of wheel positioning provides fixed independent wheel directions allowing carriage travel parallel and/or perpendicular to the edge of a building, carriage travel in predetermined directions, and rotatable motion about the center of the carriage. A third mode of wheel positioning allows each wheel assembly to freely swivel in any direction. The control element also allows the wheel positioning mode of each wheel assembly to be independently selected from any of the three wheel positioning modes described above. For instance, if the carriage includes four of the wheel assemblies, the four wheel steering mode can be selected for two of the wheel assemblies, while the free swiveling mode can be selected for the other two wheel assemblies.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 4 is a partial side elevational view of a wheel in a downward rolling position;

FIG. 5 is a partial side elevational view of a wheel in a retracted position allowing a king pin housing support to contact a support surface to support the carriage;

DETAILED DESCRIPTION OF THE INVENTION

Figure 1:
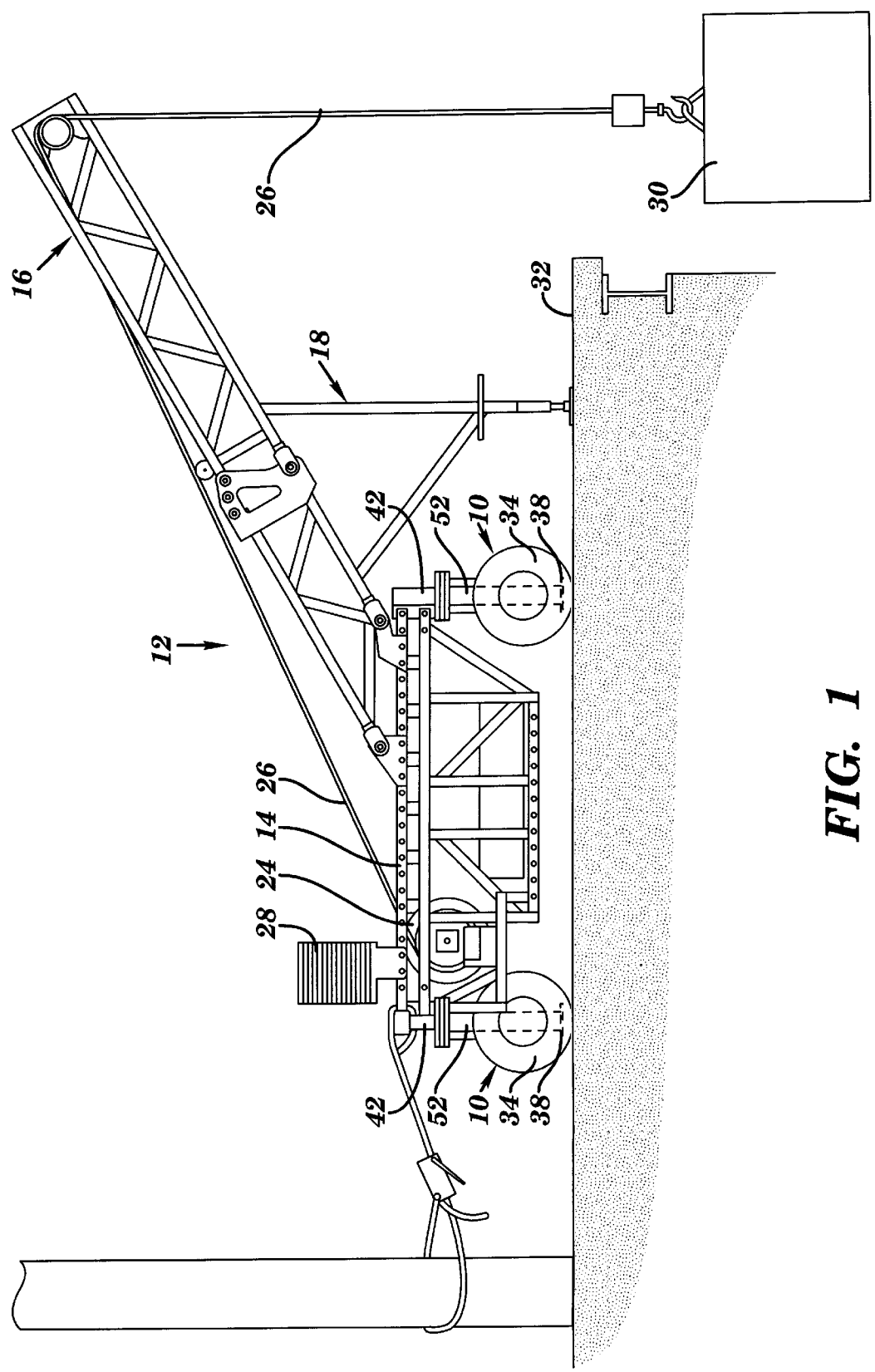
FIG. 1 is a side elevational view of a mobile roof crane which incorporates a plurality of the wheel assemblies of the present invention.

Although certain preferred embodiments of the present invention will be shown and described in detail, it should be understood that various changes and modifications may be made without departing from the scope of the present invention. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings.

Referring to FIG. 1, there is illustrated a side elevational view of a mobile roof crane 12 including a plurality of wheel assemblies 10 in accordance with the present invention. Each wheel assembly 10 is attached to the carriage 14 of the mobile roof crane 12 and includes at least one wheel 34. The mobile roof crane 12 also includes a boom assembly 16, boom support assembly 18, winch 24, cable 26, and counterweight 28. In this application, the wheel assemblies 10 allow the crane to be easily steered and rolled into position for lifting a load 30 to the roof 32 of a structure.

Each wheel assembly 10 includes a wheel retraction apparatus 40 (FIGS. 2 and 3) for selectively retracting and extending the wheels 34 relative to the carriage 14, and a fixed length king pin housing support 52. The king pin housing support 52 supports the weight of the carriage 14 when the wheels 34 are in a retracted state. A support pad 38 is attached to a lower end of the king pin housing support 52. The upper end of the king pin housing support 52 is rotatably attached to a mounting bracket 42. The mounting bracket 42 is attached to the carriage 14.

In operation, before the load 30 is lifted by the mobile roof crane 12, the wheels 34 of each wheel assembly are retracted toward the carriage 14 by the wheel retraction apparatus 40. As the wheels 34 are retracted, the carriage 14 is lowered toward the roof 32 until the support pads 38 attached to the king pin housing supports 52 come into contact with the roof 32. As the wheels 34 are retracted further, the wheels 34 are lifted from the roof 32, and the carriage 14 is fully supported by the support pad 38 and the king pin housing support 52. Conversely, when the wheels 34 are extended downward by the wheel retraction apparatus 40 beyond the support pad 38, the wheels 34 contact the roof 32 and support the carriage 14, thereby allowing the mobile roof crane 12 to be easily steered and displaced on the roof 32.

Figure 2:
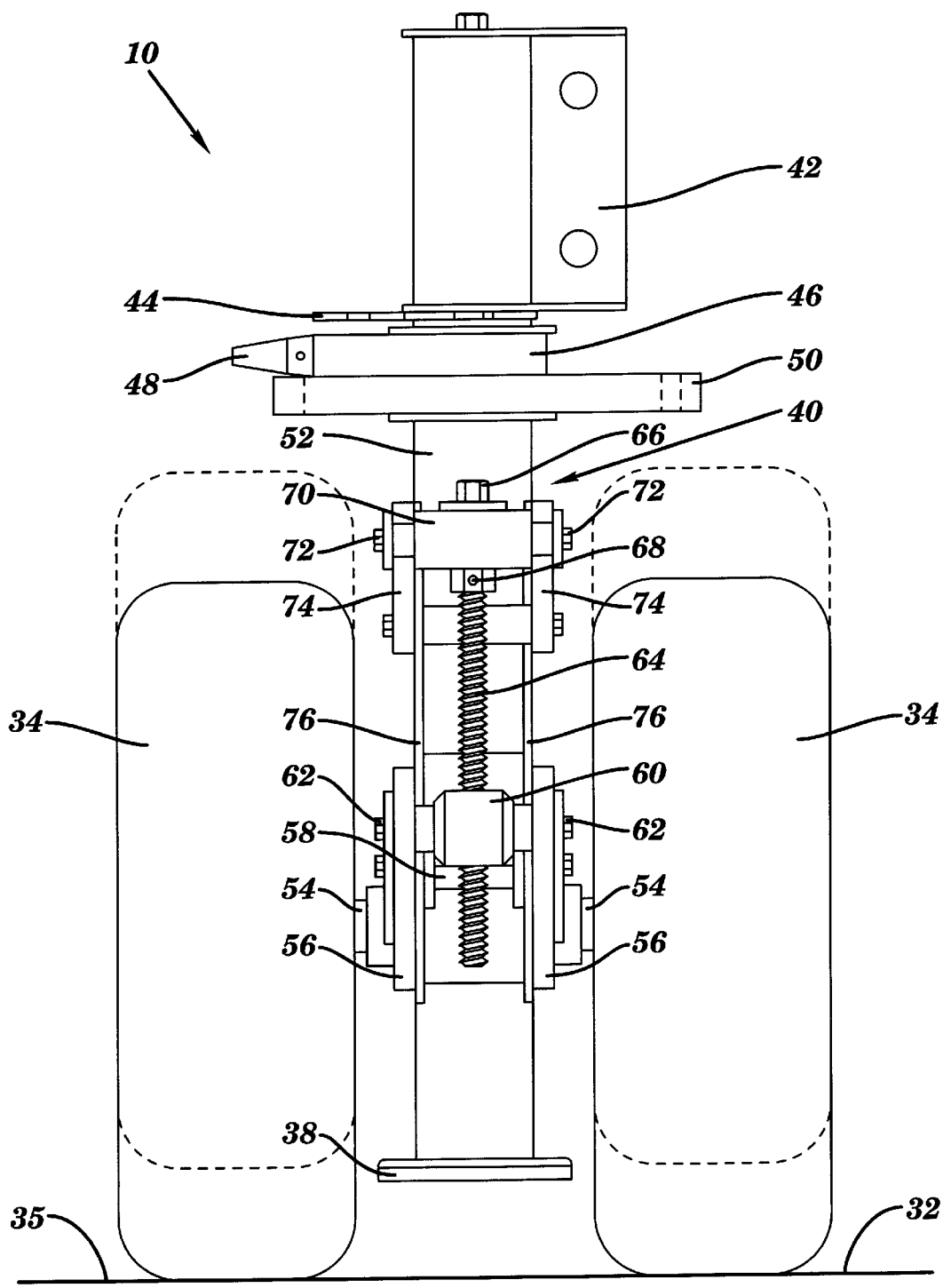
FIG. 2 is a front elevational view of a wheel retraction apparatus in accordance with the present invention.
Figure 3:
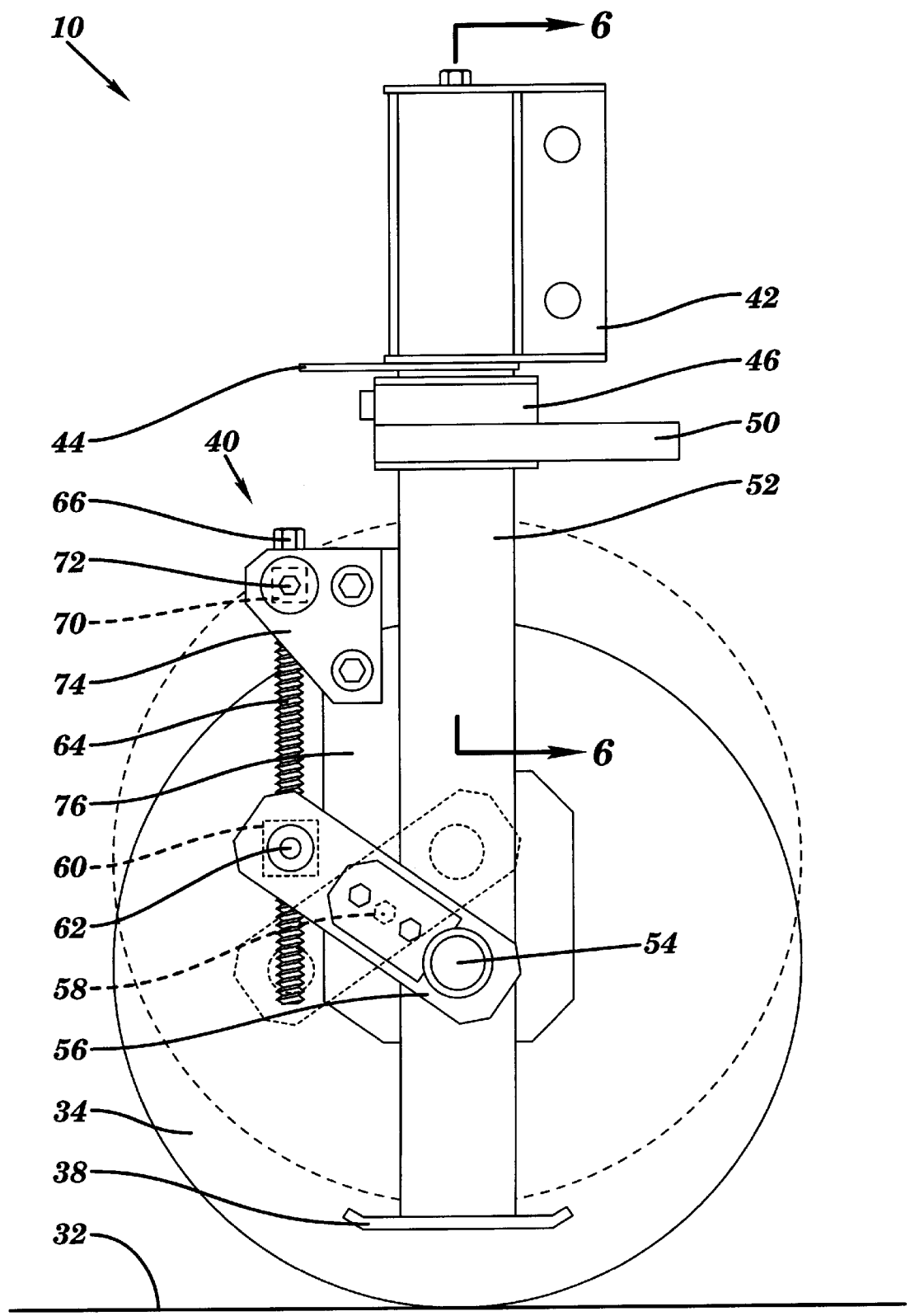
FIG. 3 is a side elevational view of the wheel retraction apparatus.

The features of a wheel assembly 10 and the wheel retraction apparatus 40 are illustrated in greater detail in FIGS. 2 and 3. FIG. 2 provides a partial front elevational view of the wheel retraction apparatus 40, while FIG. 3 provides a partial side elevational view of the wheel retraction apparatus 40 with one wheel 34 removed for clarity. Phantom dotted lines indicate the movement of the wheels 34 from extended to retracted locations.

The wheel assembly 10 includes the mounting bracket 42, a direction control plate 44, a selector plate 46, a control element 48, a steering arm 50, the king pin housing support 52, the support pad 38, and the wheel retraction apparatus 40.

The wheel retraction apparatus 40 includes wheel axles 54 for rotatably supporting the wheels 34, axle arms 56, an axle arm shaft 58, a trunnion nut 60, trunnion bolts 62, a jack screw 64, a jack screw head 66, a trunnion lock nut 68, a trunnion block 70, trunnion block bolts 72, trunnion plates 74, and mounting plates 76.

Referring to FIGS. 2 and 31 the mounting bracket 42 allows the wheel assembly 10 to be conveniently attached to the carriage 14. The direction control plate 44 is rigidly attached to the mounting bracket 42, while the king pin housing support 52 is rotatably attached to the mounting bracket 42. The selector plate 46 is rigidly attached to the king pin housing support 52, so that any rotation of the selector plate 46 causes a direct rotation of the king pin housing support 52. The steering arm 50 is freely rotatable about the king pin housing support 52.

The mounting plates 76 are fixed to, or integrally formed with, the king pin housing support 52. The trunnion block 70 is rotatably attached to the trunnion plates 74 using trunnion block bolts 72 or other suitable hardware. The trunnion plates 74 are attached to the king pin housing support 52 by the mounting plates 76. A first end of the jack screw 64 passes through and is rotatably attached to the trunnion block 70. The location of the trunnion block 70 relative to the jack screw head 66 is maintained by the trunnion lock nut 68. The second end of the jack screw 64 is threadedly attached to the trunnion nut 60. Again, the trunnion nut 60 is rotatably attached to the axle arms 56 using trunnion bolts 62 or other suitable hardware.

The axle arms 56 pivot about the axle arm shaft 58 which is attached to the mounting plates 76. The axle arms 56 pivot about the axle arm shaft 58 in response to the rotation of the jack screw 64. For example, when the jack screw 64 is rotated in a first direction such that the trunnion nut 60 and the axle arm 56 are displaced in an upward direction, the wheel axles 54 and associated wheels 34 on the other end of the axle arm 56 are displaced away from the carriage 14 in a downward direction. As shown in FIG. 4, this causes the wheels 34 to engage the roof 32, thereby lifting the king pin housing support 52 and the attached support pad 38 away from the roof 32. Correspondingly, when the jack screw 64 is rotated in a second, opposing direction, the trunnion nut 60 and the axle arms 56 are displaced in a downward direction, thereby displacing the wheel axles 54 and associated wheels 34 on the other end of the axle arm 56 toward the carriage 14 in an upward direction. As shown in FIG. 5, this action displaces the wheels 34 toward the carriage 14 until the support pad 38 on the king pin housing support 52 engages the roof 32.

Figure 6:
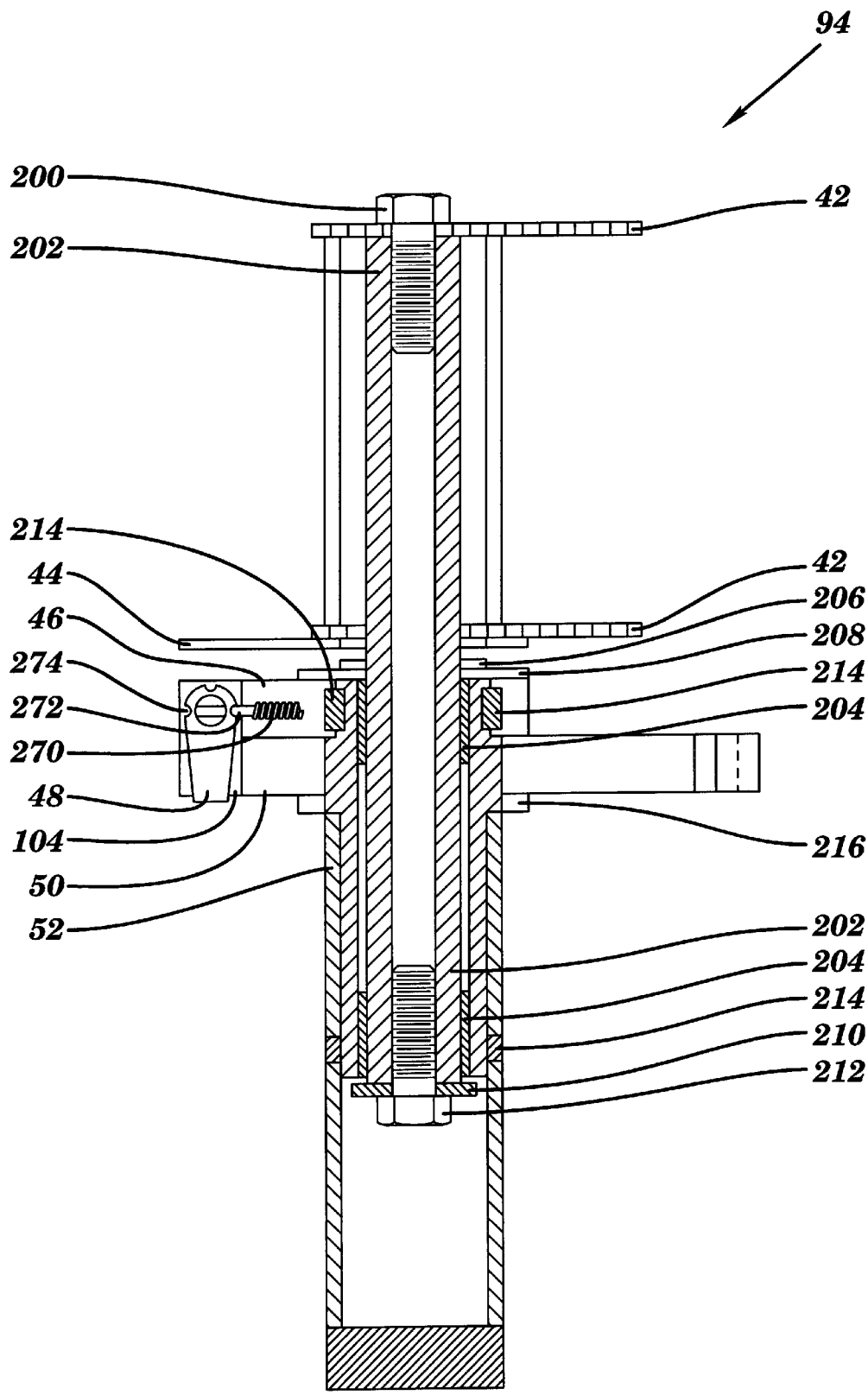
FIG. 6 is a fragmentary cross-sectional view of the king pin mounting assembly taken along line 6—6 of FIG. 3.

FIG. 6 is a fragmentary cross-sectional view of a king pin mounting assembly 94 taken along line 6—6 of FIG. 3. The king pin mounting assembly 94 is used to rotatably couple the king pin housing support 52 to the carriage 14. A bolt 200 fixedly attaches a king pin 202 to the mounting bracket 42. The mounting bracket 42 is attached to the carriage 14 (see e.g., FIG. 7). Cylindrical bearings 204 are attached to the inner surface of the king pin housing support 52, between the king pin housing support 52 and the king pin 202. The cylindrical bearings 204 allow the king pin housing support 52 to rotate about the king pin 202. A thrust bearing assembly 206 and a thrust washer 208 are located between the mounting bracket 42 and the king pin housing support 52. The thrust bearing assembly 206 and the thrust washer 208 support the load from the king pin housing support 52 while providing low friction during the rotation of the king pin housing support 52. A king pin washer 210 is attached to the lower end of the king pin 202 by a bolt 212. An inner stop 215 of the king pin housing support 52 engages the king pin washer 210, thereby retaining the king pin housing support 52 on the king pin 202.

The direction control plate 44, selector plate 46, control element 48, and steering arm 50 are also illustrated in FIG. 6. The direction control plate 44 is welded, bolted, or otherwise rigidly attached to the mounting bracket 42. The selector plate 46 is attached to the king pin housing support 52 by keys 214. The steering arm 50 rotates about the king pin housing support 52 and is vertically restrained between a flange 216 and the selector plate 46. The control element 48 is held in position by means of a spring 270, a pin 272, and three detent notches 274. The spring 270 and the pin 272 are positioned within a hole formed in the selector plate 46. The spring 270 biases the pin 272 in an outward direction so that as the control element 48 is rotated, the pointed end of the pin 272 is forced into one of the three detent notches 274, thereby selectively securing the control element in three different positions. In FIG. 6, the control element 48 is shown rotated in a downward direction, engaging the notch 104 in the steering arm 50. As detailed below, when in this configuration, the control element 48 actuates the four wheel steering mode of the wheel steering apparatus of the present invention.

Figure 7:
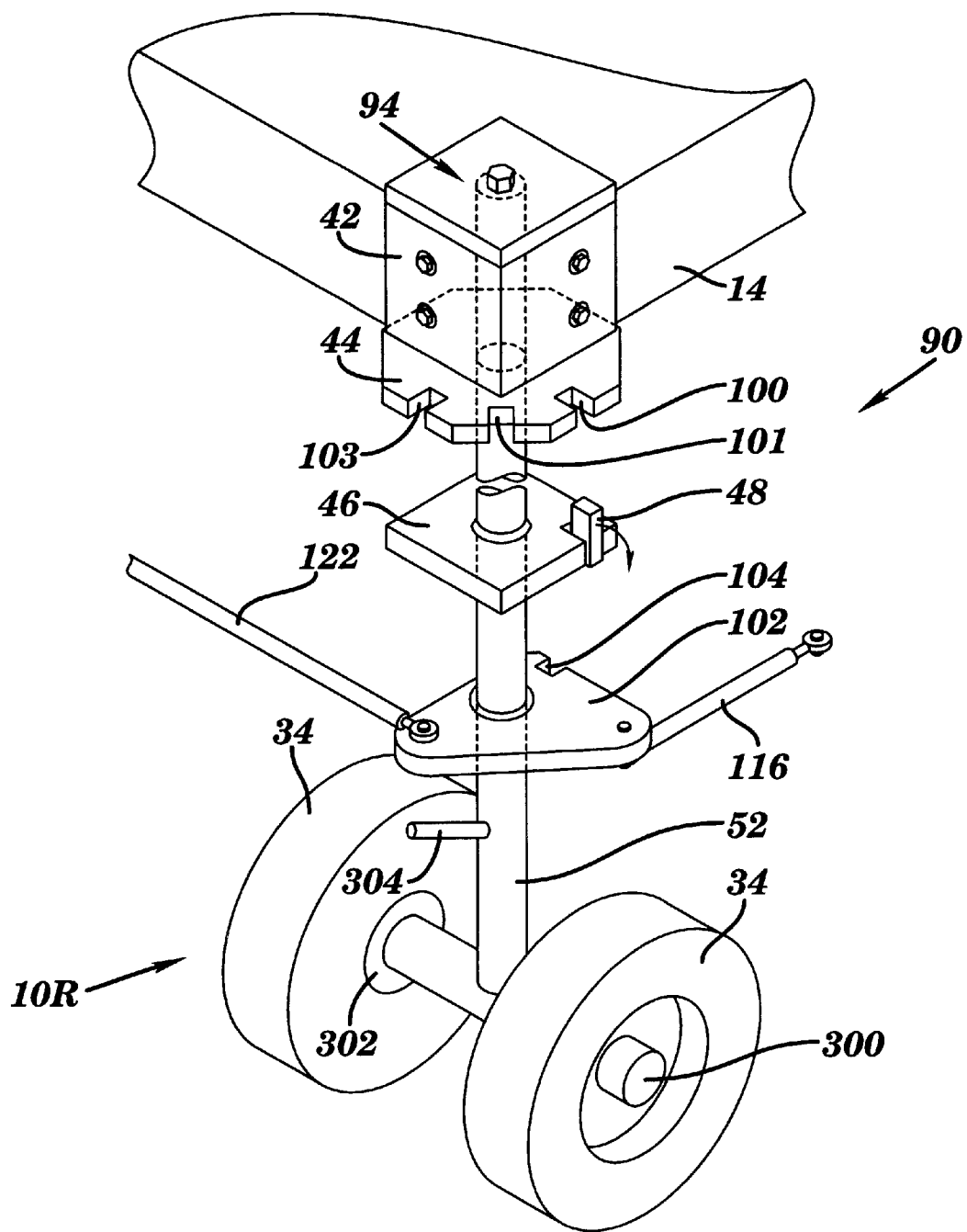
FIG. 7 is an exploded perspective view of the wheel steering apparatus.

FIG. 7 is an exploded perspective view of the wheel steering apparatus 90 for a rear wheel assembly 10R of the carriage 14. Each rear wheel assembly 10R is provided with a similar steering apparatus 90. Also shown are a king pin housing support 52 and a portion of the carriage 14. The king pin housing support 52 is rotatably attached to the carriage 14 by the king pin mounting assembly 94. Additional views of the components of the wheel steering apparatus 90 are provided in FIGS. 2, 3 and 6.

Three modes of wheel positioning can be selected using the single control element 48. The control element 48 is pivotally attached to the selector plate 46. The selector plate 46 is rigidly attached to the king pin housing support 52 so that any rotation of the selector plate 46 causes a direct rotation of the king pin housing support 52.

The direction control plate 44 is rigidly attached to the carriage 14. The direction control plate 44 includes a plurality of fixed notches 100, 101, and 103 that are configured to selectively receive the control element 48 to control the orientation of the wheels 34. Although three fixed notches 100, 101, and 103 are shown, it should be clear that any number of fixed notches may be employed. Also, the orientation of the fixed notches may be adjusted to provide specific wheel directions. A rear steering arm 102 includes a notch 104 for selectively receiving the control element 48 to activate the four wheel steering mode. A rear steering tie rod 116 and a rear transfer tie rod 122 are pivotally attached to the rear steering arm 102. Each front and rear wheel assembly 10F and 10R of the mobile roof crane 12 includes at least the control element 48, selector plate 46, and the direction control plate 44.

Figure 8:
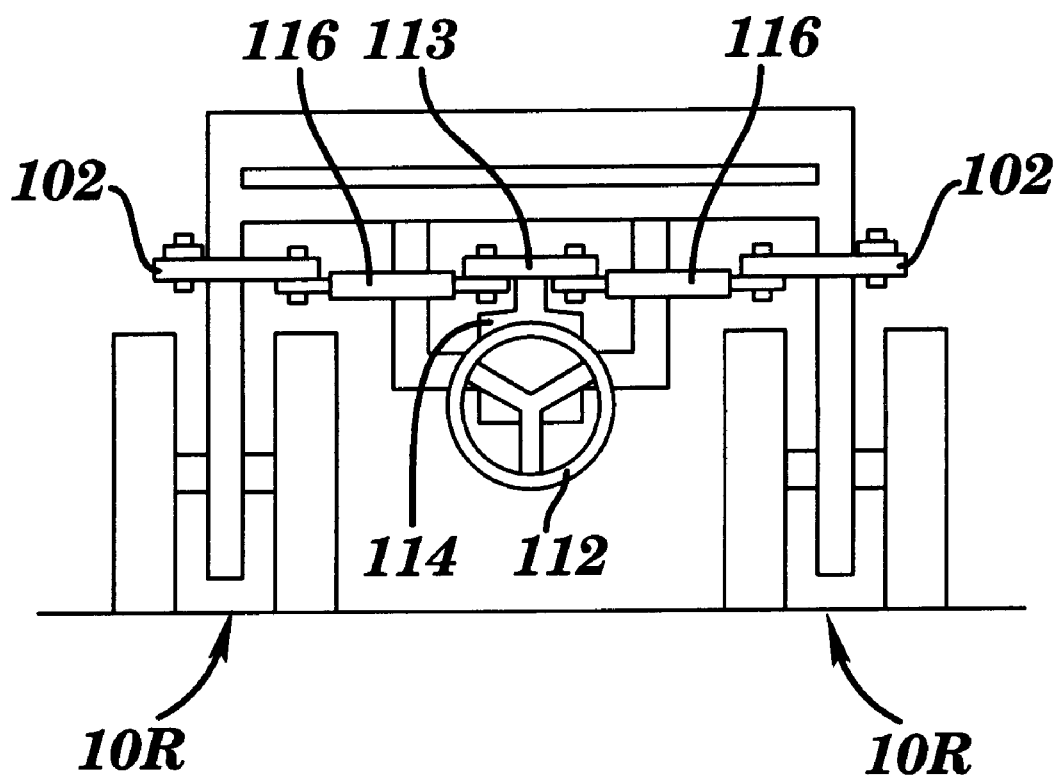
FIG. 8 is a rear elevational view of the wheel steering apparatus.
Figure 9:
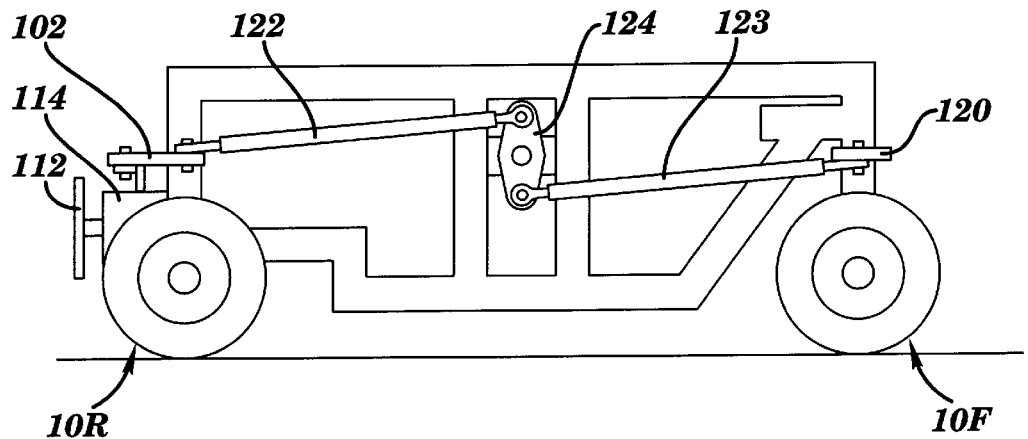
FIG. 9 is a side elevational view of the wheel steering apparatus.
Figure 10:
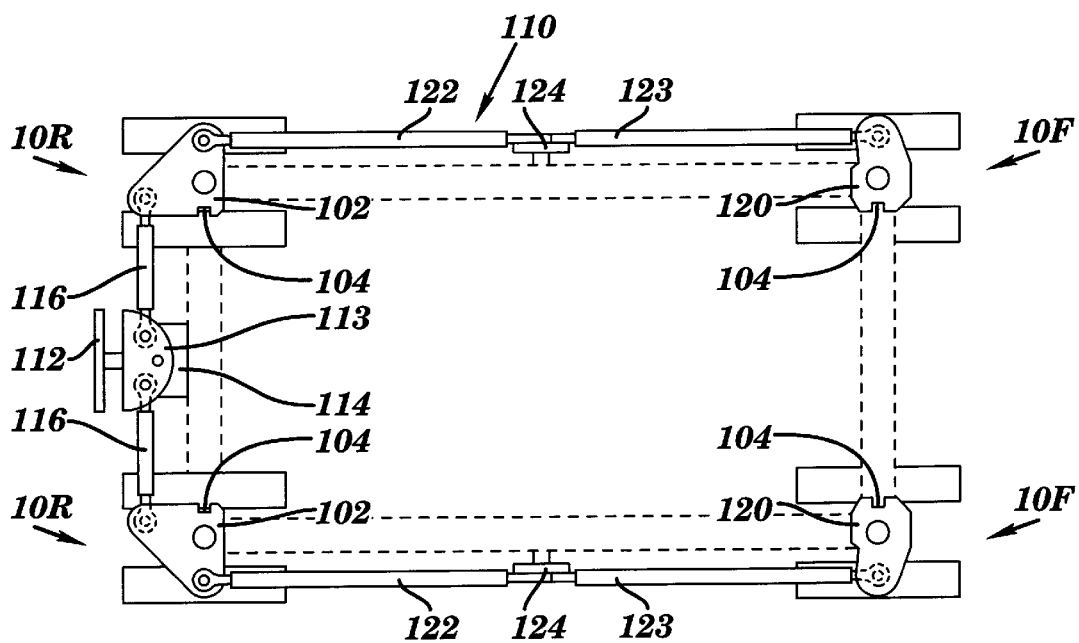
FIG. 10 is a plan view of the wheel steering apparatus.

In a first mode of wheel positioning, the control element 48 is pivoted to engage the notch 104 in the rear steering arm 102 (see also FIGS. 8, 9 and 10). This activates a four wheel steering mode. In the four wheel steering mode, the steering tie rod 116 provides rotary motion to the rear steering arm 102 which in turn rotates the king pin housing 52 and the wheels 34. As further illustrated in FIGS. 8, 9, and 10, the rotary motion of the rear steering arm 102 additionally imparts a rotary motion to a corresponding front steering arm 120 through a linkage assembly.

In a second mode of wheel positioning, the control element 48 is rotated to engage a notch 100, 101, or 103 in the direction control plate 44. This causes the wheels 34 to be pointed and locked in a specific direction. For example, notch 100 will provide wheel alignment for a sideways direction, notch 103 will provide a straight forward or backward direction, and notch 101 will provide a wheel alignment causing rotation of the carriage 14 about its center.

In a third mode of wheel positioning, the control element 48 is rotated and secured in a direction parallel to the selector plate 46 as shown in FIG. 2, allowing the king pin housing support 52 and the wheels 34 to swivel and rotate in any direction. The control element 48 is secured in a fixed direction by the spring 270, pin 272, and one of the detent notches 274 as shown in FIG. 6.

The wheels 34 (FIG. 1) can be provided with a power source 300 to turn each wheel 34 individually. Also, the wheels 34 can be provided with a brake system 302 to stop/prevent the wheels 34 from turning. The brakes can be operated from a single location using a lever 304 that keeps the brakes locked unless an operator pulls on the lever to release the brakes. This provides a safety feature to prevent the carriage from rolling unless an operator desires carriage motion. In addition, turning of the carriage can be assisted by simultaneously powering wheel assemblies on opposing sides of the carriage in opposite directions.

FIGS. 8, 9, and 10 illustrate the wheel steering apparatus 110 of the mobile roof crane 12 in the four wheel steering mode. The steering apparatus 110 includes a steering wheel 112, a steering gearbox 114, a steering arm 113, steering tie rods 116, rear steering arms 102, front steering arms 120, rear transfer tie rods 122, front transfer tie rods 123, and transfer arms 124. Also shown are the front wheel assemblies 10F and the rear wheel assemblies 10R.

The rear steering arms 102 and the front steering arms 120 are engaged in the four wheel steering mode by rotating and securing each of the control elements 48 in a corresponding notch 104. Referring to FIG. 10, when the notches 104 on the front and rear control arms 120, 102 are engaged by the control elements 48, the steering apparatus 110 is connected to the king pin housing supports 52 of the two front wheel assemblies 10F and the two rear wheel assemblies 10R.

Wheel direction in the four wheel steering mode is controlled by the steering wheel 112. Specifically, a clockwise or counterclockwise rotation of the steering wheel 112 results, via the steering gearbox 114, in a corresponding rotation of the steering arm 113 in a counterclockwise or clockwise direction. The steering arm 113 pulls/pushes the steering tie rods 116 which in turn cause rotation of the rear steering arms 102 and displacement of the rear transfer tie rods 122 in a first direction. The displacement of the rear transfer tie rods 122 causes a rotation of the transfer arms 124, a reverse displacement of the front transfer tie rods 123, and a rotation of the front steering arms 120 in a direction opposite to that of the rear steering arms 102. Thus, the steering apparatus 110 provides an automatic synchronous turning motion such that as the rear steering arms 102 rotate in a clockwise direction, the front steering arms 120 simultaneously rotate in a counterclockwise direction. Similarly, when the rear steering arms 102 rotate in a counterclockwise direction, the front steering arms 120 rotate in a clockwise direction.

Figure 11:
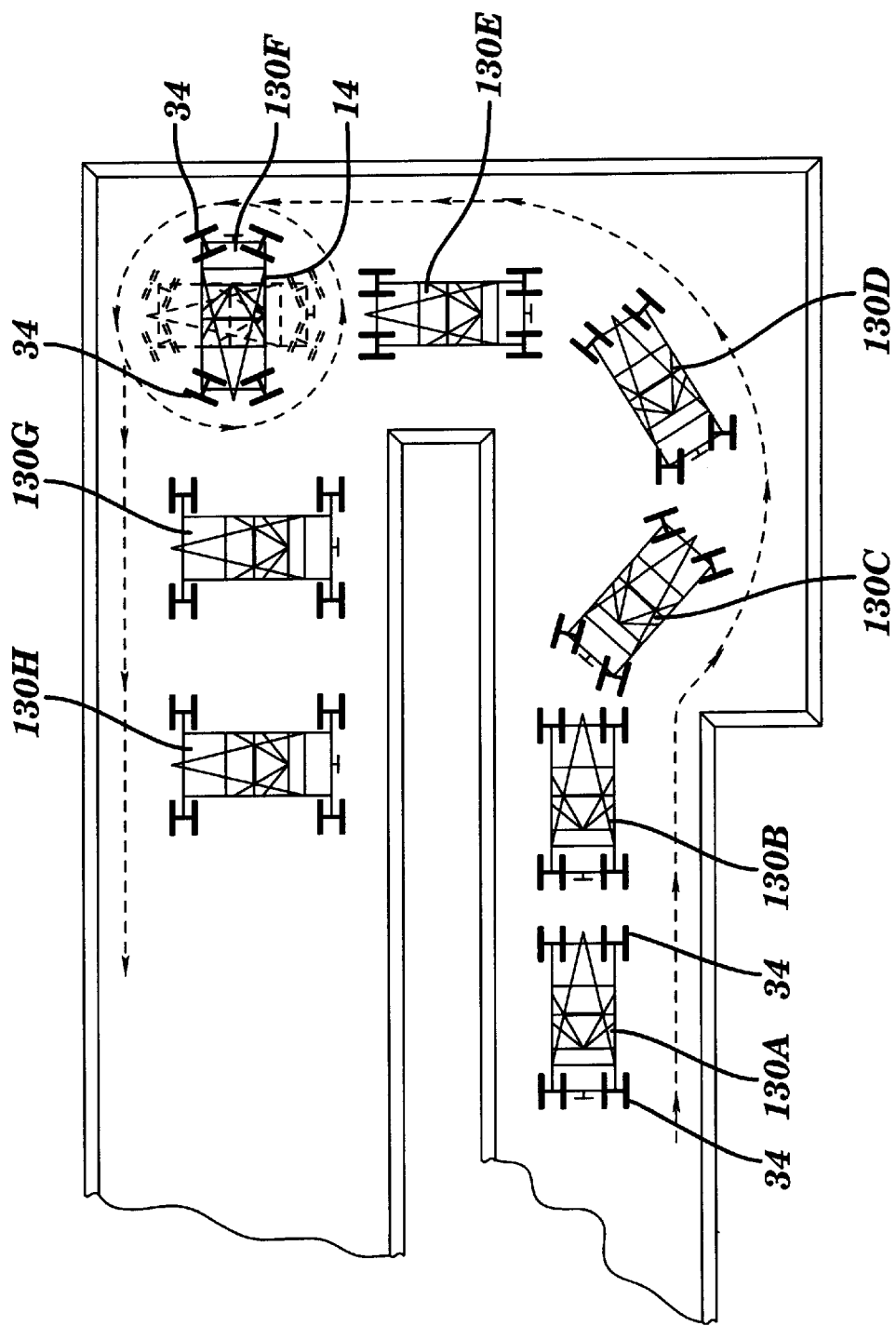
FIG. 11 illustrates the multi-directional steering modes provided to the carriage by the wheel steering apparatus of the present invention.

FIG. 11 is a plan view showing the steering modes available for providing multi-directional movement of the mobile roof crane 12. For specific direction control, the control element 48 in each wheel assembly 10 is engaged in one of the notches 100, 101, and 103 in the direction control plate 44. In FIG. 11, position 130A shows the wheels 34 locked in a straight forward position, position 130F shows the wheels 34 locked in a position causing rotation of the carriage 14 about its center, and positions 130G and 130H show the wheels 34 locked in a position for sideways motion. The four wheel steering mode provided by the steering apparatus 110 is illustrated in positions 130B, 130C, 130D and 130E.

Figure 12:
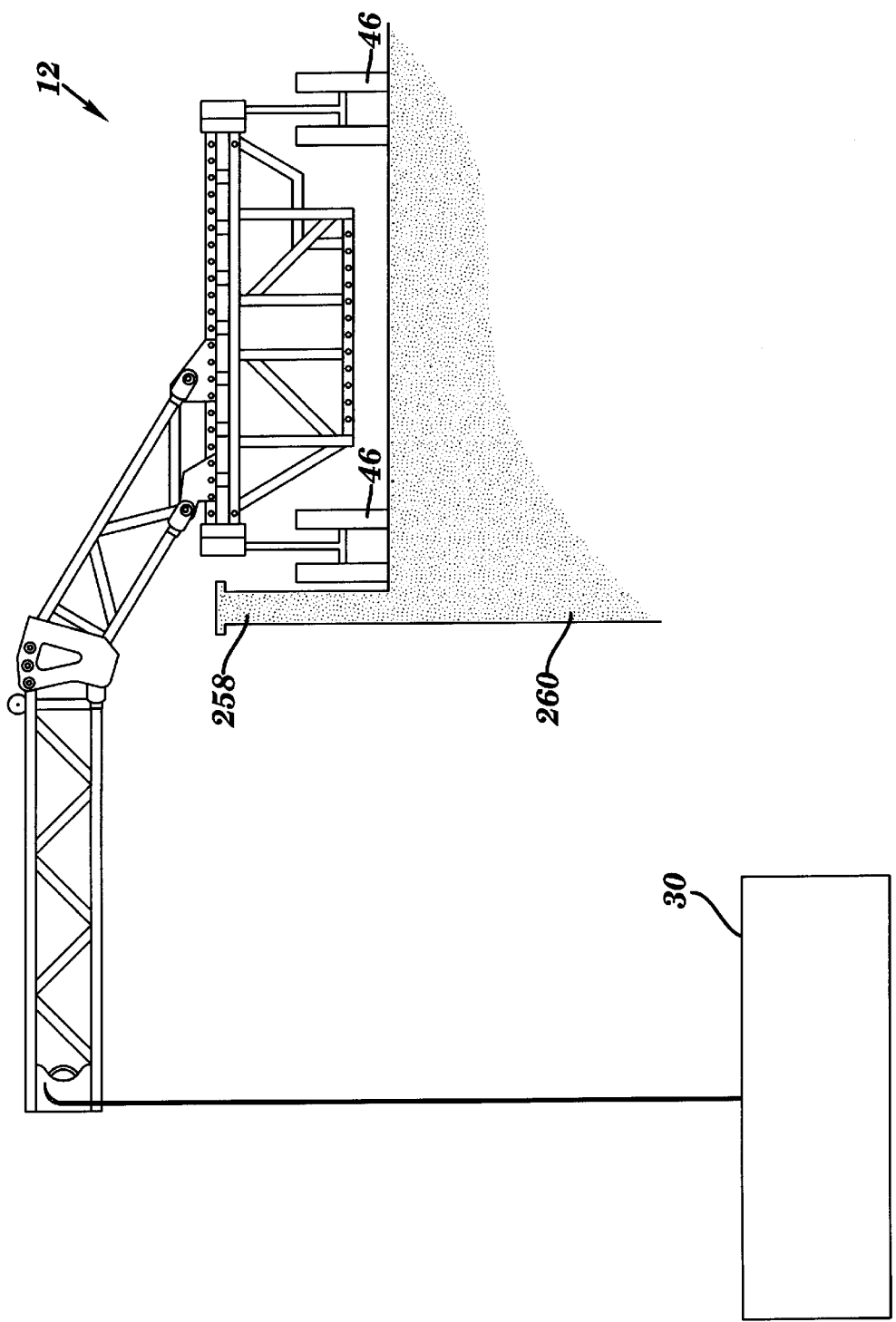
FIG. 12 is a side elevational view showing the wheel positions that allow movement parallel to a roof edge.

FIG. 12 is a side elevational view of the mobile crane 12 wherein the wheels 34 are arranged in positions that allow movement of the mobile roof crane 12 parallel to a roof edge 258. In this configuration, the mobile roof crane 12 can be used to move a load 30 along a building face 260.

The foregoing description of the present invention has been presented for purposes of illustration and description. It is not intended to be exhaustive or to limit the invention to the precise form disclosed, and many modifications and variations are possible in light of the above teaching. For example, the wheel assemblies 10 have been shown in use on a mobile roof crane 12. However, the wheel assemblies 10 can be employed in a wide variety of other types of utility vehicles. Such modifications and variations that may be apparent to a person skilled in the art are intended to be included within the scope of this invention as defined by the accompanying claims.

We claim:

1. A wheel assembly comprising:
    a mounting bracket for attaching the wheel assembly to a carriage;
    a fixed length support rotatably attached to the mounting bracket, wherein a support pad is attached to a lower end of the fixed length support for contacting a support surface;
    at least one wheel rotatably attached to a wheel retraction apparatus, wherein the wheel retraction apparatus is attached to the fixed length support and provides retraction and extension of each wheel relative to the fixed length support; and
    a control system for selecting a wheel positioning mode of the wheel assembly.

2. The wheel assembly according to claim 1, further including a power source for rotating at least one wheel of the wheel assembly, thereby causing movement of the carriage.

3. The wheel assembly according to claim 1, further including a braking system for stopping rotation of at least one wheel of the wheel assembly.

4. The wheel assembly according to claim 3, wherein the braking system further includes a lever for actuating and releasing the braking system.

5. The wheel assembly according to claim 1, wherein the control system of the wheel assembly includes a control element for selecting a wheel positioning mode of the wheel assembly.

6. The wheel assembly according to claim 5, wherein, in a steering position, the control element of the wheel assembly selects a wheel positioning mode wherein the wheel assembly is controlled by a steering apparatus.

7. The wheel assembly according to claim 5, wherein, in a fixed position, the control element of the wheel assembly selects a wheel positioning mode wherein the wheel assembly is positioned in a fixed direction.

8. The wheel assembly according to claim 5, wherein, in a swivel position, the control element of the wheel assembly selects a wheel positioning mode wherein the wheel assembly can freely swivel in any direction.

9. The wheel assembly according to claim 5, wherein:
    in a first position, the control element of the wheel assembly selects a wheel positioning mode wherein the wheel assembly is controlled by a steering apparatus;
    in a second position, the control element of the wheel assembly selects a wheel positioning mode wherein the wheel assembly is positioned in a fixed direction; and
    in a third position, the control element of the wheel assembly selects a wheel positioning mode wherein the wheel assembly can freely swivel in any direction.

10. The wheel assembly according to claim 7, wherein the fixed direction is parallel to a longitudinal axis of the carriage.

11. The wheel assembly according to claim 7, wherein the fixed direction is perpendicular to a longitudinal axis of the carriage.

12. The wheel assembly according to claim 7, wherein the fixed direction provides rotatable motion about a center of the carriage.

13. The wheel assembly according to claim 6, wherein the steering apparatus further includes a steering wheel for controlling a direction of movement of the carriage.

14. The wheel assembly according to claim 5, wherein a first end of the control element is pivotally attached to a selector plate attached to the fixed length support.

15. The wheel assembly according to claim 14, further including a direction control plate attached to the mounting bracket, the direction control plate having a plurality of notches, wherein a second end of the control element is configured to selectively engage one of the plurality of notches in the direction control plate to position the wheel assembly in a fixed direction.

16. The wheel assembly according to claim 14, wherein the wheel assembly is free to swivel in any direction when a second end of the control element is located in a disengagement position.

17. The wheel assembly according to claim 14, further including a steering apparatus for controlling an orientation of the wheel assembly, the steering apparatus including a steering arm having a notch, wherein a second end of the control element is configured to selectively engage the notch in the steering arm to activate the steering apparatus.

18. The wheel assembly according to claim 1, wherein the wheel retraction apparatus comprises:
    an axle arm pivotally attached to the fixed length support;
    an axle shaft attached to the axle arm, wherein each wheel is rotatably attached to the axle shaft; and
    an adjustment system coupled to the axle arm for adjusting a position of the axle shaft relative to the fixed length support to retract or extend each wheel.

19. The wheel assembly according to claim 18, wherein the adjustment system includes a rotatable actuator, wherein rotation of the actuator in a first direction causes an upward retraction of each wheel relative to the fixed length support, and wherein rotation of the actuator in a second direction causes an extension of each wheel relative to the fixed length support.

20. The wheel assembly according to claim 1, wherein a plurality of the wheel assemblies are attached to a mobile crane.

21. A wheel assembly comprising:
    a mounting bracket for attaching the wheel assembly to a carriage;
    a fixed length support rotatably attached to the mounting bracket;
    at least one wheel rotatably attached to a wheel retraction apparatus, wherein the wheel retraction apparatus is attached to the fixed length support and provides retraction and extension of each wheel relative to the fixed length support;
    a control system for selecting a wheel positioning mode of the wheel assembly, wherein the control system of the wheel assembly includes a control element for selecting a wheel positioning mode of the wheel assembly, wherein:
    in a first position, the control element of the wheel assembly selects a wheel positioning mode wherein the wheel assembly is controlled by a steering apparatus;
    in a second position, the control element of the wheel assembly selects a wheel positioning mode wherein the wheel assembly is positioned in a fixed direction; and
    in a third position, the control element of the wheel assembly selects a wheel positioning mode wherein the wheel assembly can freely swivel in any direction.

22. A wheel assembly comprising:
    a mounting bracket for attaching the wheel assembly to a carriage;
    a fixed length support rotatably attached to the mounting bracket;
    at least one wheel rotatably attached to a wheel retraction apparatus, wherein the wheel retraction apparatus is attached to the fixed length support and provides retraction and extension of each wheel relative to the fixed length support; and a control system for selecting a wheel positioning mode of the wheel assembly, wherein the control system of the wheel assembly includes a control element for selecting a wheel positioning mode of the wheel assembly, and wherein a first end of the control element is pivotally attached to a selector plate attached to the fixed length support.

23. A wheel assembly comprising:

a mounting bracket for attaching the wheel assembly to a carriage;

a fixed length support rotatably attached to the mounting bracket;

at least one wheel rotatably attached to a wheel retraction apparatus, wherein the wheel retraction apparatus is attached to the fixed length support and provides retraction and extension of each wheel relative to the fixed length support, wherein the wheel retraction apparatus comprises:

an axle arm pivotally attached to the fixed length support;

an axle shaft attached to the axle arm, wherein each wheel is rotatably attached to the axle shaft;

an adjustment system coupled to the axle arm for adjusting a position of the axle shaft relative to the fixed length support to retract or extend each wheel; and a control system for selecting a wheel positioning mode of the wheel assembly.

\* \* \* \* \*